United States Patent
Nachum et al.

(10) Patent No.: US 8,611,257 B1
(45) Date of Patent: *Dec. 17, 2013

(54) METHOD AND APPARATUS FOR POWER REDUCTION IN NETWORK

(75) Inventors: Youval Nachum, Shoham (IL); Denis Krivitski, Nazereth Illit (IL)

(73) Assignee: Marvell Israel (M.I.S.L) Ltd., Yokneam (IL)

(*) Notice: Subject to any disclaimer, the term of this patent is extended or adjusted under 35 U.S.C. 154(b) by 0 days.

This patent is subject to a terminal disclaimer.

(21) Appl. No.: 13/490,915

(22) Filed: Jun. 7, 2012

Related U.S. Application Data (63) Continuation of application No. 12/391,562, filed on Feb. 24, 2009, now Pat. No. 8,199,672.

(60) Provisional application No. 61/031,153, filed on Feb. 25, 2008, provisional application No. 61/037,080, filed on Mar. 17, 2008, provisional application No. 61/037,086, filed on Mar. 17, 2008.

(51) Int. Cl.
*H04L 12/28* (2006.01)
*H04L 12/50* (2006.01)

(52) U.S. Cl.
USPC .......................................... 370/255; 370/386

(58) Field of Classification Search
USPC .................... 370/217–220, 254, 255, 386
See application file for complete search history.

(56) References Cited

U.S. PATENT DOCUMENTS

| | | | |
|---|---|---|---|
| 5,488,609 A | 1/1996 | Hluchyj et al. | |
| 5,687,172 A * | 11/1997 | Cloonan et al. | 370/395.71 |
| 6,000,035 A * | 12/1999 | Matsushima et al. | 713/320 |
| 6,118,761 A | 9/2000 | Kalkunte et al. | |
| 6,704,296 B1 | 3/2004 | Crayford et al. | |
| 6,775,280 B1 * | 8/2004 | Ma et al. | 370/392 |
| 7,253,353 B2 | 8/2007 | Stabler | |
| 7,515,526 B2 | 4/2009 | Elkayam et al. | |
| 7,580,348 B2 * | 8/2009 | Maruyama et al. | 370/219 |
| 8,004,970 B2 | 8/2011 | Bowen et al. | |
| 2002/0067694 A1 * | 6/2002 | Cheng et al. | 370/230 |
| 2003/0061476 A1 * | 3/2003 | Phelps et al. | 713/100 |
| 2006/0250962 A1 | 11/2006 | Chikamatsu | |
| 2007/0081463 A1 | 4/2007 | Bohra et al. | |
| 2007/0201380 A1 * | 8/2007 | Ma et al. | 370/254 |
| 2009/0003229 A1 | 1/2009 | Loh et al. | |

OTHER PUBLICATIONS

U.S. Appl. No. 12/410,879, Krivitski et al., filed Mar. 25, 2009.
IEEE Standard for Local and Metropolitan Area Networks—Link Aggregation; IEEE Std 802.1AX 2008; The Institute of Electrical and Electronics Engineers, Inc., New York, NY, Nov. 3, 2008.

* cited by examiner

*Primary Examiner* — Hong Cho (57) ABSTRACT

Aspects of the disclosure provide a method for reducing power consumption in a network switch. The method includes detecting a traffic load on a network link system coupled to the network switch. The network switch can include a first power consumption configuration providing a first link capacity for the network link system, and a second power consumption configuration, which is lower than the first power consumption configuration, providing a second link capacity that is lower than the first link capacity. The method further includes determining whether the traffic load on the network link is lower than a first boundary threshold, and reconfiguring the network switch from the first power consumption configuration into the second power consumption configuration if the traffic load is lower than the first boundary threshold.

16 Claims, 7 Drawing Sheets

METHOD AND APPARATUS FOR POWER REDUCTION IN NETWORK

INCORPORATION BY REFERENCE

This application is a continuation of U.S. patent application Ser. No. 12/391,562, filed on Feb. 24, 2009, now patented as U.S. Pat. No. 8,199,672, which claims the benefit of U.S. Provisional Application No. 61/031,153, "Adaptive Power Reduction on A Network Switch Having LAG Ports" filed on Feb. 25, 2008, U.S. Provisional Application No. 61/037,080, "Adaptive Power Reduction on Crossbar Uplink" filed on Mar. 17, 2008, and U.S. Provisional Application No. 61/037,086, "Adaptive Power Reduction on Link" filed on Mar. 17, 2008, which are incorporated herein by reference in their entirety.

BACKGROUND

Network devices may have significant power consumption requirement. For numerous reasons, it is typically desirable to reduce the power consumption of the network devices.

SUMMARY

Aspects of the disclosure can provide a method for reducing power consumption in a network switch. The method can include detecting a traffic load on a network link system coupled to the network switch. The network switch can include a first power consumption configuration providing a first link capacity for the network link system, and a second power consumption configuration, which is lower than the first power consumption configuration, providing a second link capacity that is lower than the first link capacity. The method further includes determining whether the traffic load on the network link system is lower than a first boundary threshold, and reconfiguring the network switch from the first power consumption configuration into the second power consumption configuration if the traffic load is lower than the first boundary threshold.

To determine whether the traffic load is lower than the first boundary threshold, the method can further include determining whether the traffic load keeps below the first boundary threshold for a time duration, and reconfiguring the network link system into the second power consumption configuration if the traffic load keeps below the first boundary threshold for the time duration.

Additionally, the network switch can include a third power consumption configuration providing a third link capacity that is larger than the first link capacity. The method can include determining whether the traffic load is higher than a second boundary threshold, and reconfiguring the network switch from the first power consumption configuration into the third power consumption configuration if the traffic load is higher than the second boundary threshold.

To reconfigure the network switch into the second power consumption configuration, the method can include powering off a port of the network switch. In another example, the method can include powering off a crossbar switch module of the network switch. Additionally, the method can include reducing an operating frequency of a port of the network switch.

To detect the traffic load on the network link system, the method can include calculating at least one of a sum ingress rate and a sum en-queue rate of the network switch.

Aspects of the disclosure can provide a network switch. The network switch can include a plurality of ports coupled respectively to a plurality of parallel link members of a network link system. Each port is able to power on for providing a traffic capacity to the network link system, and is able to power off to reduce power consumption of the network switch. The network switch can include a controller. The controller can selectively power on a subset of the plurality of ports to provide the network link system with a first link capacity based on a detected traffic load to or from the network link system.

Further, the controller can power off at least one port of the subset to provide the network link system with a second link capacity that is lower than the first link capacity if the detected traffic load is lower than a first boundary threshold. According to an aspect, the controller may power off the one port if the detected traffic load keeps below the first boundary threshold for a time duration.

Further, the controller can additionally power on a port of the plurality of ports if the detected traffic load is higher than a second boundary threshold.

According to the disclosure, the detected traffic load can be calculated based on at least one of a sum ingress rate and a sum en-queue rate of network switch.

In addition, aspects of the disclosure can provide a network switch that includes a port configured to transmit data at selectable frequencies over a network link to another network switch, and a controller module configured to select an operating frequency for the port responsively to a detected traffic load on the network link.

Further, the controller can be configured to select a first operating frequency for the port if the detected traffic load to the network link system is lower than a first boundary threshold and to select a second operating frequency that is higher than the first operating frequency if the detected traffic load to the network link system is higher than a second boundary threshold.

According to the disclosure, the network switch can have a first power consumption when the port operates at the first operating frequency, and a second power consumption that is greater than the first power consumption when the port operates at the second operating frequency.

Further, aspects of the disclosure can provide a network switch. The network switch can include a plurality of crossbar switch modules coupled to a plurality of packet processing components in parallel. Each of the crossbar switch module can be coupled to the plurality of packet processing components. Further, each of the crossbar switch is able to power on for providing a traffic capacity between the plurality of packet processing components, and is able to power off to reduce power consumption of the network switch. The network switch can include a controller configured to selectively power on a subset of the crossbar switch modules to provide a first link capacity based on a detected traffic load of the network switch.

Additionally, the controller can power off at least one crossbar switch module of the subset to provide a second link capacity that is lower than the first link capacity if the detected traffic load is lower than a first boundary threshold. In an embodiment, the controller can be configured to power off the one crossbar switch module if the detected traffic load keeps below the first boundary threshold for a time duration.

Further, the controller can be configured to additionally power on a crossbar switch module if the detected traffic load is higher than a second boundary threshold.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
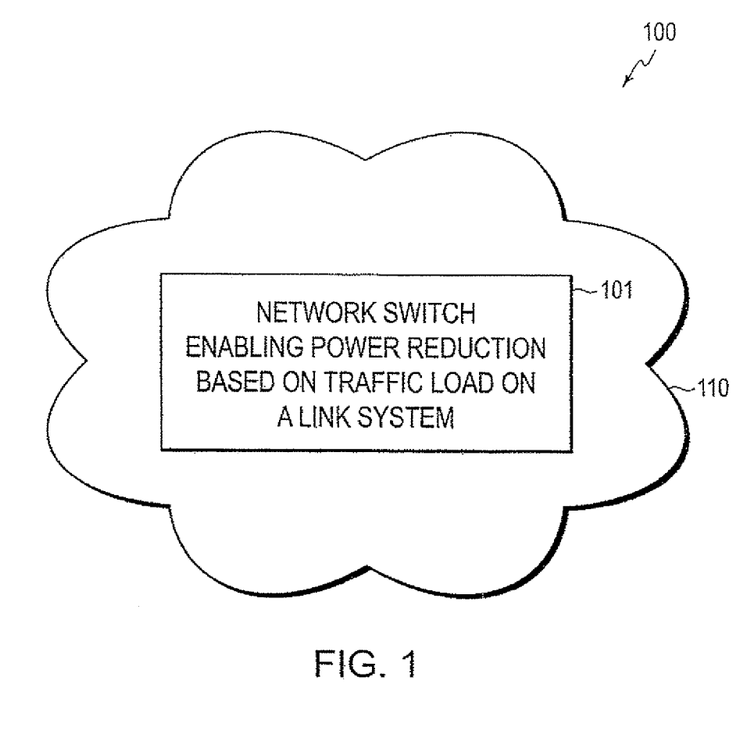
FIG. 1 shows a block diagram of a network example according to the disclosure.

FIG. 1 shows a block diagram of a network example 110 including a network switch 101 according to the disclosure. The network switch 101 can be coupled to a link system or can include a link system. For example, the network switch 101 may include ports that drive links coupled to other network switches. In another example, the network switch 101 may include a crossbar link system having a plurality of crossbar components. According to the disclosure, the network switch 101 may have multiple power consumption configurations corresponding to multiple link capacities of the link system. Further, the network switch 101 can be configured in a reduced power consumption configuration based on a traffic load offered to the link system. In response to the traffic load, the network switch 101 may adapt a number of ports that are available to drive the links coupled to other network switches, or it may adapt a number of parallel crossbar link components, or it may select an operating frequency of the ports, for example. Thus, the link system can provide a satisfactory link capacity for the traffic load, while the network switch 101 can reduce power consumption.

More specifically, the network switch 101 can be configured in a first power consumption configuration and a second power consumption configuration. In the first power consumption configuration, the network switch 101 may provide a first link capacity to the link system and have a first power consumption. In the second power consumption configuration, the network switch 101 may provide a second link capacity to the link system and have a second power consumption. Generally, the power consumption of the network switch 101 can be proportional to the link capacity provided to the link system. For example, if the first link capacity is larger than the second link capacity, the first power consumption is larger than the second power consumption.

In an embodiment, the network switch 101 may be configured in the first power consumption configuration, initially. Further, the network switch 101 may be reconfigured in the second power consumption configuration based on the traffic load, for example when the traffic load is lower than a first boundary threshold. Thus, the power consumed by the network switch 101 can be reduced.

On the other hand, if the network switch 101 is configured in the second power consumption configuration initially, the network switch 101 may be reconfigured into the first power consumption configuration, for example, when an expected traffic load is larger than a second boundary threshold.

Figure 2A:
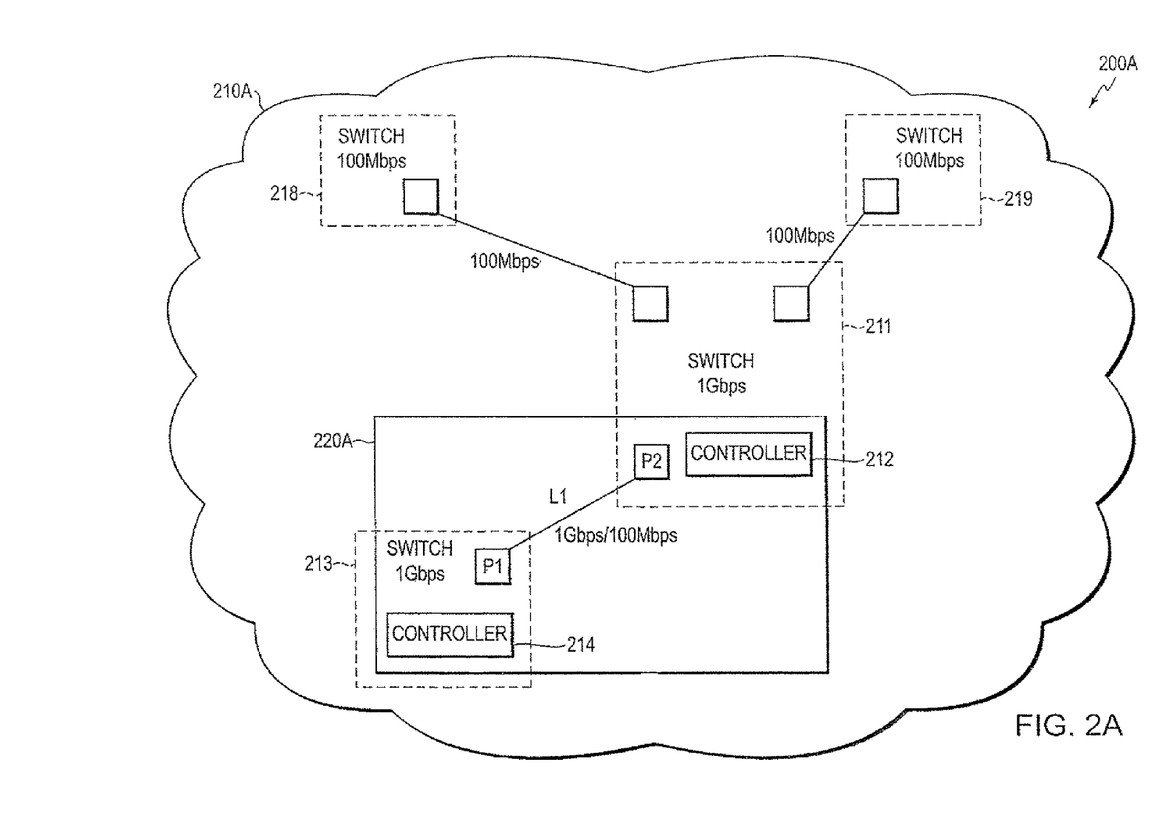
FIGS. 2A-2C show block diagrams of network switches examples according to the disclosure.

FIG. 2A shows a network example 210A that includes a link system example 220A according to an embodiment of the disclosure. The network 210A may include various network switches, such as 211, 213, 218 and 219, of different switching capabilities. For example, the network switches 211 and 213 may have a maximum switching bandwidth in 1 Gbps scale, while the network switches 218 and 219 may have a maximum switching bandwidth in 100 Mbps scale. The network switches of the different switching capabilities may be coupled together by links, as shown in FIG. 2A.

According to the disclosure, the link system 220A can include a link L1 between a port P1 of the network switch 213 and a port P2 of the network switch 211, and corresponding port circuits of the ports P1 and P2. Further, the link system 220A may include one or more controllers, such as a controller 214 in the network switch 213 and a controller 212 in the network switch 211. The controller 214 can configure the port P1 and the controller 212 can configure the port P2, based on a traffic load offered to the link L1.

According to the disclosure, network switches can include multiple power consumption configurations corresponding to multiple link capacities. For example, the network 210A may be in an upgrade process. During the upgrade process, a portion of the network 210A, such as the network switch 211 and the network switch 213, may be upgraded from, for example, 100 Mbps to 1 Gbps. Generally, the upgraded network switches 211 and 213 can be configured to be backward compatible, in order to facilitate the upgrade process. Therefore, the network switches 211 and 213 can selectively operate at a first frequency that supports the 100 Mbps maximum data rate and at a second frequency that is larger than the first frequency and can support the 1 Gbps maximum data rate.

Generally, the network switch power consumption can be substantially proportional to operating frequency, due to the dynamic power consumption dominance, for example. Therefore, the network switch 211 or the network switch 213 can be configured into a configuration that supports the 100 Mbps maximum data rate and is referred as a first power consumption configuration, and can be configured into another configuration that supports the 1 Gbps maximum data rate and is referred as a second power consumption configuration. The first power consumption configuration can have a reduced power consumption comparing to the second power consumption configuration.

During operation, for example, at a time when traffic demands are high, the network switch 211 and the network switch 213 may be in the second power consumption configuration. Accordingly, the link system 220A may operate at the second frequency, which is higher than the first frequency, and can have the 1 Gbps maximum data rate. Further, a traffic load of the link system 220A, such as an offered traffic load, can be measured. In an embodiment, the traffic load can be an expected traffic load, or a future traffic load, that can be estimated. According to the disclosure, the entire 1 Gbps capacity may not be utilized at all times, such as when there is a substantially lower traffic load on link L1. Thus, when the traffic load is lower than a lower boundary threshold, the controller 212 can reconfigure the network switch 211 into the first power consumption configuration by configuring port P2, and the controller 214 can reconfigure the network switch 213 into the first power consumption configuration by configuring port P1. The first power consumption configuration can support a lower traffic capacity, such as 100 Mbps.

In an embodiment, the threshold can be lower than 100 Mbps, for example by a margin. The margin can enable the link system 220A to avoid packet dropping due to traffic variation. In another embodiment, if the traffic load keeps below the lower boundary threshold for a time duration, the network switches 211 and 213 are reconfigured; and if the traffic load does not keep below the threshold in the time duration, the network switches 211 and 213 may keep the second power consumption configuration. Thus, traffic spike influence can be avoided in the link system 220A.

On the other hand, the network switches 211 and 213 may be reconfigured to provide higher traffic capability when traffic demands become high. For example, the network switches 211 and 213 may be in the first power consumption configuration, at a time when the traffic demands are low. Accordingly, the network switches 211 and 213 may operate at the first frequency, and provide the 100 Mbps maximum data rate. Further, the traffic load of the link system 220A can vary. For example, the measured traffic load of the link system 220A may become higher than an upper boundary threshold. Then, the network switches 211 and 213 can be reconfigured into the second power consumption configuration to increase data rate, in order to avoid dropping packets. In an embodiment, the upper boundary threshold can be lower than 100M bps, for example, with a margin. The margin can enable the network switches 211 and 213 to have enough time to reconfigure and stabilize to provide higher link capacity to the link system 220A.

It is noted that the controller 212 and the controller 214 may use any suitable communication techniques and protocols to communicate, negotiate and determine reconfigurations of the network switches 211 and 213.

Figure 2B:
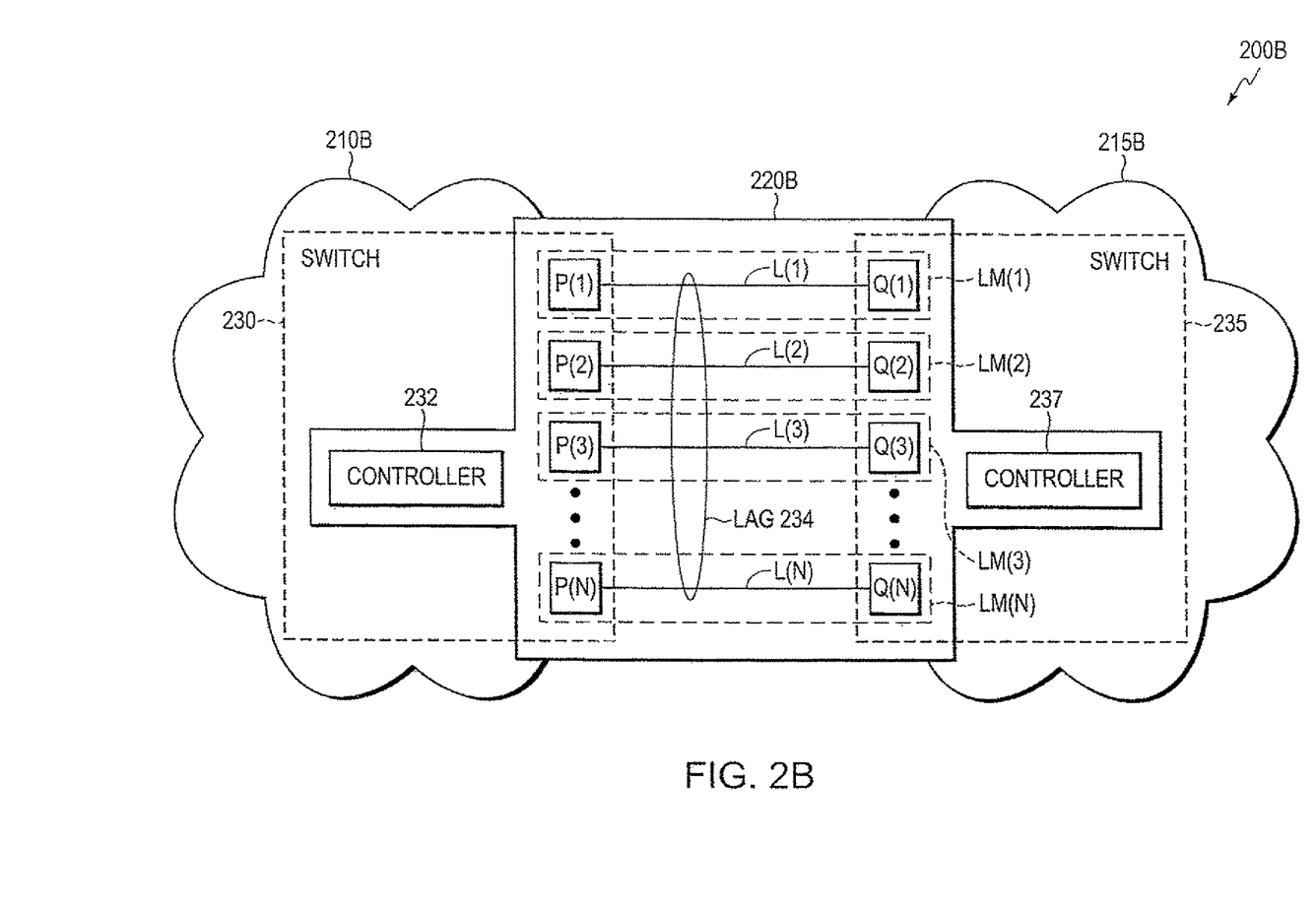

FIG. 2B shows a network example 200B that includes a link system example 220B that can selectively aggregate parallel links according to an embodiment of the disclosure. The network 200B may include a first network switch 230 and a second network switch 235 that can couple two network nodes 210B and 215B. The first network switch 230 and the second network switch 235 can be coupled together by multiple link members LM(1)-LM(N). More specifically, the first network switch 230 may include N ports P(1)-P(N). The second network switch 235 may also include N ports Q(1)-Q(N). The N ports of the first network switch 230 and the N ports of the second network switch 235 can be respectively coupled, as shown by links L(1)-L(N), to form a link aggregation group (LAG) 234. Thus, each link member can include a link and corresponding port circuits in the first network switch 230 and the second network switch 235. In addition, the link system 220B may include one or more controllers, such as a controller 232 in the first network switch 230 that can control power supplies to the ports P(1)-P(N), and a controller 237 in the second network switch 235 that can control power supplies to the ports Q(1)-Q(N). The controller 232 and 237 can selectively power up or power off the port circuits to activate or de-activate the multiple link members LM(1)-LM(N). These elements can be coupled together as shown in FIG. 2B.

According to the disclosure, the first and second network switches 230 and 235 may include multiple power consumption configurations corresponding to multiple link capacities on the LAG 234. In an example, the power supplies to the ports P(1)-P(N) and Q(1)-Q(N) can be respectively controlled, thus the first and second network switches 230 and 235 may include N power consumption configurations corresponding to N link capacities of the LAG 234, respectively. In each power consumption configuration, a number of ports of the network switches 230 and 235 can be selectively powered up to activate a number of link members to provide a corresponding link capability, and the rest ports can be powered off to save power. More specifically, in a first power consumption configuration, P(1) and Q(1) can be powered up to activate the link member LM(1); in a second power consumption configuration, P(1)-P(2) and Q(1)-Q(2) can be powered up to activate the link members LM(1)-LM(2); so on so forth; and in an Nth power consumption configuration, P(1)-P(N) and Q(1)-Q(N) can be powered up to activate the link members LM(1)-LM(N).

During operation, for example, at a time, the network switches 230 and 235 may be in the M (1<M<N) power consumption configuration. Accordingly, the ports P(1)-P(M) and Q(1)-Q(M) can be powered up to activate the link members LM(1)-LM(M), and the rest of the ports can be powered off to de-activate corresponding link members and reduce power consumption. Further, a traffic load of the link system 220B, such as an offered traffic load, can be measured, and can be compared to thresholds to determine whether to reconfigure the network switches 230 and 235. In an embodiment, the traffic load can be an expected traffic load, or a future traffic load, that can be estimated. The traffic load may be compared to an upper boundary threshold and a lower boundary threshold. When the traffic load is higher than the upper boundary threshold, the network switch 230 and 235 can be configured into the M+1 power consumption configuration. Accordingly, the controllers 232 and 237 may power up the ports P(M+1) and Q(M+1) to activate the link member LM(M+1).

In an embodiment, the upper boundary threshold can be lower than the link capacity corresponding to the M power consumption configuration, for example by a margin. The margin can enable the network switches 230 and 235 to have enough time to reconfigure the ports. Additionally, the margin can enable the link system 220B to avoid dropping packets.

In another case, when the traffic load is lower than the lower boundary threshold, the network switches 230 and 235 can be configured into the M−1 power consumption configuration. Accordingly, the controllers 232 and 237 may power off the ports P(M) and Q(M) to de-activate the link member LM(M), and reduce power consumption at the network switches 230 and 235.

In an embodiment, the lower boundary threshold can be lower than the link capacity corresponding to the M−1 power consumption configuration, for example by a margin. The margin can enable the link system 220B to avoid packet dropping due to traffic variation.

In another embodiment, the traffic load can be monitored for a time duration, to ensure that the traffic load keeps below the lower boundary threshold in the time duration before the reconfiguration. Thus, influences of traffic spikes can be reduced, and the link system 220B can have an increased stability.

Figure 2C:
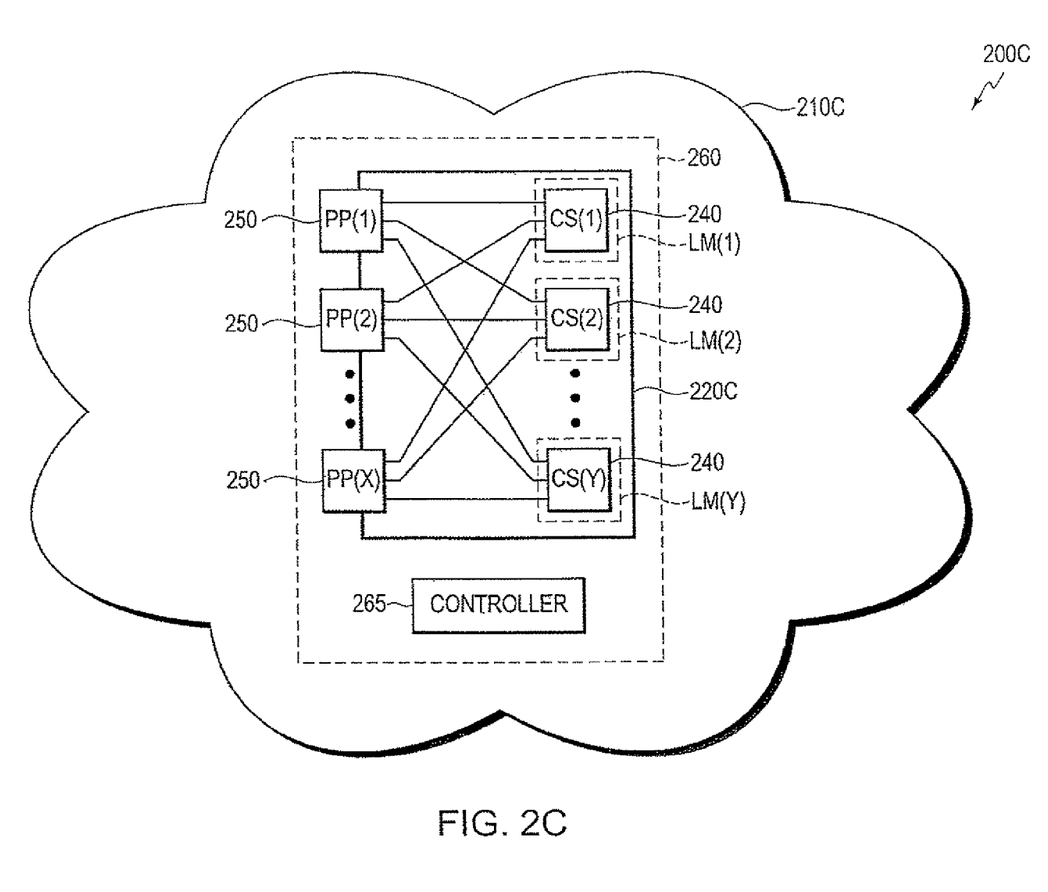

FIG. 2C shows a network example 210C that includes a crossbar link system example 220C according to an embodiment of the disclosure. The network 210C may include a network switch 260. The network switch 260 may include multiple packet processors PP(1)-PP(X), and multiple crossbar switch modules CS(1)-CS(Y). Each packet processor can be coupled with each of the multiple crossbar switch modules CS(1)-CS(Y) by an crossbar uplink. In addition, the network switch 260 may include a controller 265 that can control power supplies to the multiple crossbar switch modules to power up or power off the crossbar switch modules CS(1)-CS(Y). These elements can be coupled together as shown in FIG. 2C.

The link system 220C can include multiple link members LM(1)-LM(Y). Each link member may include a crossbar switch, uplinks coupled to the crossbar switch, and port circuits of the multiple packet processors that are coupled to the uplinks.

According to the disclosure, the network switch 260 may include multiple power consumption configurations corresponding to multiple link capacities of the link system 220C. For example, when the multiple crossbar switch modules CS(1)-CS(Y) can be powered up and powered off individually, the network switch 260 may include Y power consumption configurations. In each power consumption configuration, a number of crossbar switch modules can be powered up to activate a number of link members, and the rest of the crossbar switch modules can be powered off to reduce power consumption of the network switch 260. More specifically, in a first power consumption configuration, crossbar switch module CS(1) can be powered up to activate the link member LM(1) to provide links among the multiple packet processors; in a second power consumption configuration, crossbar switch modules CS(1)-CS(2) can be powered up to activate the link members LM(1)-LM(2) to provide links among the multiple packet processors; so on so forth; and in a Yth power consumption configuration, crossbar switch modules CS(1)-CS(Y) can be powered up to activate the link members LM(1)-LM(Y) to provide links among the multiple packet processors.

During operation, for example, at a time, the network switch 260 may be in the M (1<M<Y) power consumption configuration. Accordingly, crossbar switch modules CS(1)-CS(M) can be powered up to activate the link members LM(1)-LM(M), and the rest of the crossbar switch modules can be powered off to reduce power consumption at the network switch 260. Further, a traffic load of the link system 220C, such as an offered traffic load, can be measured, and can be compared to thresholds to determine whether to reconfigure the network switch 260. In an embodiment, the traffic load can be an expected traffic load, or a future traffic load, that can be estimated. The traffic load may be compared to an upper boundary threshold and a lower boundary threshold. When the traffic load is higher than the upper boundary threshold, the network switch 260 can be reconfigured into the M+1 power consumption configuration. Accordingly, the controller 265 can power up the crossbar switch module CS(M+1).

In an embodiment, the upper boundary threshold can be lower than the link capacity corresponding to the M power consumption configuration, for example by a margin. The margin can enable the network switch 260 to have enough time to reconfigure the system, for example to power up and stabilize the crossbar switch module CS(M+1). Additionally, the margin can enable the link system 220C to avoid dropping packets.

In another case, when the traffic load is lower than the lower boundary threshold, the network switch 260 can be configured into the M−1 power consumption configuration. Accordingly, the controller 265 may power off the crossbar switch module CS(M) to deactivate the link member LM(M) to reduce power consumption of the network switch 260.

In an embodiment, the lower boundary threshold can be lower than the link capacity corresponding to the M−1 power consumption configuration, for example by a margin. The margin can enable the link system 220C to avoid packet dropping due to traffic variation.

In another embodiment, the traffic load can be monitored for a time duration, to ensure that the traffic load keeps below the lower boundary threshold in the time duration before the reconfiguration. Thus, influences of traffic spikes can be reduced, and the link system 220C can have an increased stability.

It is noted that each of the packet processors and each of the crossbar switch modules may be implemented as an application specific integrated circuit (ASIC) in an embodiment. Further, it is noted that the controller 265 can be implemented as software, hardware, or combination of software and hardware. For example, the controller 265 may be implemented as instructions that can be stored in a memory medium. The instructions can be executed by a processor to perform the controlling functions of the controller 265.

Figure 3:
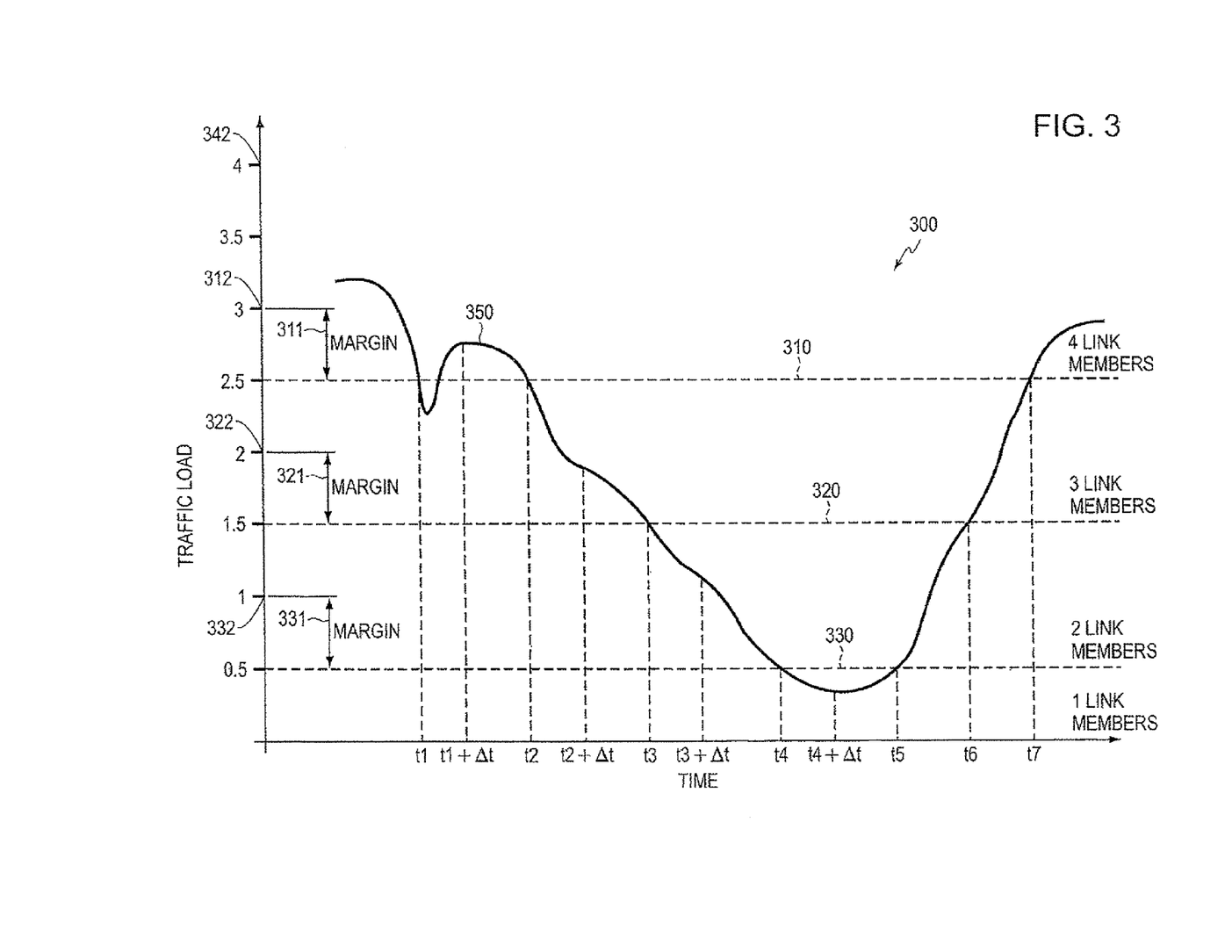
FIG. 3 shows a plot of a traffic load example illustrating power consumption configuration changes of a network switch based on the traffic load.

FIG. 3 shows a traffic load plot 300 illustrating power consumption configuration changes of a network switch example based on a traffic load. The plot 300 can include X axis for time and Y axis for the traffic load. Further, the plot 300 can include a traffic load curve 350 that shows an offered traffic load that varies with time.

The network switch may include multiple power consumption configurations corresponding to multiple link capacities of a link system. In FIG. 3, the network switch may include four power consumption configurations corresponding to four link capacities 312-342 of the link system. More specifically, a first power consumption configuration may correspond to link capacity 1, a second power consumption configuration may correspond to link capacity 2, a third power consumption configuration may correspond to link capacity 3, and a fourth power consumption configuration may correspond to link capacity 4. In an embodiment, the first power consumption configuration may correspond to activate one link member, for example, by powering up a port or a crossbar switch module of the network switch; the second power consumption configuration may correspond to activate two link members; the third power consumption configuration may correspond to activate three link members; and the fourth power consumption configuration may correspond to activate four link members. In another embodiment, the four power consumption configurations may correspond to four operating frequencies of the network switch, respectively.

Additionally, each power consumption configuration may have a corresponding lower boundary threshold and/or an upper boundary threshold for determining reconfigurations. For example, the fourth power configuration may have a corresponding lower boundary threshold 2.5; the third power configuration may have a corresponding upper boundary threshold 2.5 and a corresponding lower boundary threshold 1.5; the second power consumption configuration may have a corresponding upper boundary threshold 1.5 and a corresponding lower boundary threshold 0.5; and the first power consumption configuration may have a corresponding upper boundary threshold 0.5.

The operation of the network switch can be described with regard to the traffic load curve 350 in FIG. 3. When the network switch is in the fourth power consumption configuration, the traffic load of the link system can be compared to the corresponding lower boundary threshold 2.5 to determine reconfiguration. For example, at times, the traffic load may drop and may be below the lower boundary threshold, such as at time t1 and time t2. In addition, the traffic load can be monitored for a time duration, such as Δt, to determine whether the traffic load keeps below the lower boundary threshold. When the traffic load goes above the lower boundary threshold during Δt, as shown by the time duration between t1 and t1+Δt, the network switch can keep the fourth power consumption configuration. On the other hand, when the traffic load keeps below the lower boundary threshold during the time duration, as shown by the time duration between t2 and t2+Δt, the network switch can be reconfigured to the third power consumption configuration to reduce the network switch power consumption.

When the network switch is in the third power consumption configuration, the traffic load can be compared to the corresponding upper boundary threshold 2.5 and the corresponding lower boundary threshold 1.5. When the traffic load is higher than the upper boundary threshold 2.5, as shown by t7, the network switch may be reconfigured to the fourth power consumption configuration to increase link capacity. In an embodiment, the link system may be reconfigured immediately to avoid packet dropping.

On the other hand, when the traffic load is lower than the lower boundary threshold 1.5, the traffic load can be monitored for a time duration, such as Δt, to determine whether the traffic load keeps below the lower boundary threshold. When the traffic load keeps below the lower boundary threshold in the time duration, as shown by the time duration between t3 to t3+Δt, the network switch can be reconfigured to the second power consumption configuration to reduce power consumption. When the traffic load goes above the lower boundary threshold during the time duration, the network switch can keep the third power consumption configuration.

When the network switch is in the second power consumption configuration, the traffic load is compared to the corresponding upper boundary threshold 1.5 and the corresponding lower boundary threshold 0.5 to determine reconfiguration. When the traffic load is higher than the upper boundary threshold 1.5, as shown by t6, the network switch may be reconfigured to the third power consumption configuration to increase link capacity of the link system. In an embodiment, the network switch may be reconfigured immediately to avoid packet dropping.

On the other hand, when the traffic load is lower than the lower boundary threshold 0.5, the traffic load can be monitored for a time duration, such as Δt, to determine whether the traffic load keeps below the lower boundary threshold. When the traffic load keeps below the lower boundary threshold in the time duration, as shown by the time duration between t4 to t4±Δt, the network switch can be reconfigured to the first power consumption configuration to reduce power consumption at the network switch. When the traffic load goes above the lower boundary threshold during the time duration, the network switch can keep the second power consumption configuration.

When the network switch is in the first power consumption configuration, the traffic load can be compared to the corresponding upper boundary threshold corresponding 0.5 to determine reconfiguration. When the traffic load is higher than the upper boundary threshold 5.5, as shown by t5, the network switch may be reconfigured to the second power consumption configuration to increase link capacity. In an embodiment, the network switch may be reconfigured immediately to avoid packet dropping.

It is noted any suitable techniques can be used to measure or estimate the traffic load to a link system. In an embodiment, the traffic load may be measured by an ingress rate that sums the traffic load into ingress ports of the link system. In another embodiment, the traffic load may be measured based on queue length measurement. In another embodiment, the traffic load may be estimated by bandwidth reservation. Other suitable methods for determining current and expected network traffic may be implemented.

Figure 4:
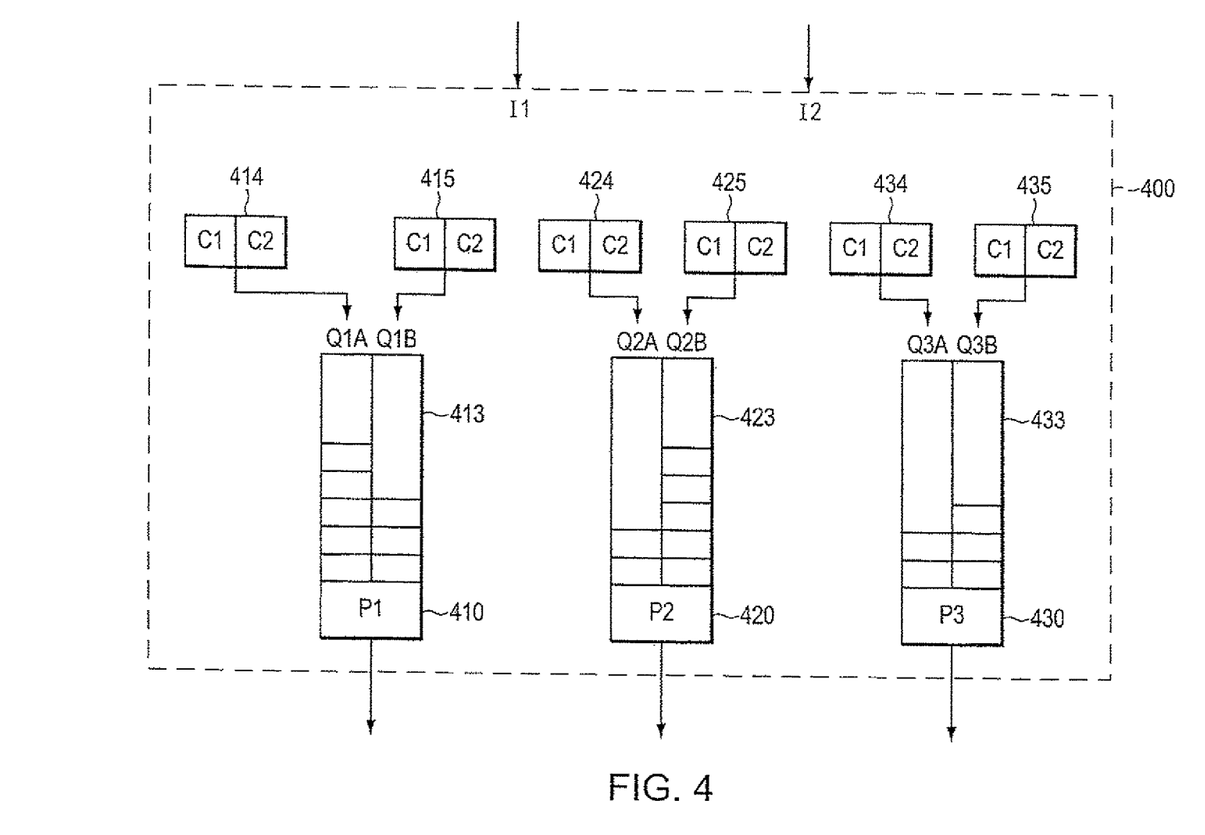
FIG. 4 shows a block diagram of a network switch device example illustrating a technique that measures a traffic load.

FIG. 4 shows a block diagram of a network switch device example 400 illustrating a technique that measures traffic load by en-queue rate. The technique can be used, for example, in the network switches 230 and 235 of FIG. 2B. The network switch device 400 may include ingress ports, such as I1 and I2, that receive packets from outside of the device. The received packets can be distributed to egress ports, such as P1-P3, that can output packets to outside of the devices. Each egress port may include one or more queues that can buffer the packets for outputting. In the FIG. 4 example, the egress port P1 can include two queues Q1A and Q1B, the egress port P2 can include two queus Q2A and Q2B, and the egress port P3 can include two queues Q3A and Q3B.

Further, the network switch device 400 may include counter pairs, such as 414, 415, 424, 425, 434 and 435. Each counter pair can include a first counter C1 and a second counter C2, and each counter pair can correspond to a queue to count an en-queue rate for the queue. In the example of FIG. 4, the counter pair 414 can correspond to the queue Q1A and count an en-queue rate for Q1A, the counter pair 415 can correspond to the queue Q113 can count an en-queue rate for Q1B, and so on so forth.

In each counter pair, one counter can be an active counter, and the other counter can be a history counter. The two counters may change roles after a time period, such as 500 μs. For example, at a time, C1 of the counter pair 414 can be the active counter, and C2 of the counter pair 414 can be the history counter. After 500 μs, C1 can become the history counter, and the C2 can become the active counter.

The active counter may count bytes that have been en-queued to the corresponding queue during the time period. For example, the active counter may start from zero, and when a packet is buffered in a queue, the number of bytes of the packet can be added in the active counter. On the other hand, the history counter may keep the counted en-queue bytes of the corresponding queue from the previous time period. Further, an en-queue rate of the queue can be calculated by averaging the bytes number in the history counter over the time period.

According to an embodiment of the disclosure, the traffic load can be measured by summing up the en-queue rates of all the queues for the egress ports of the network switch device 400.

Figure 5:
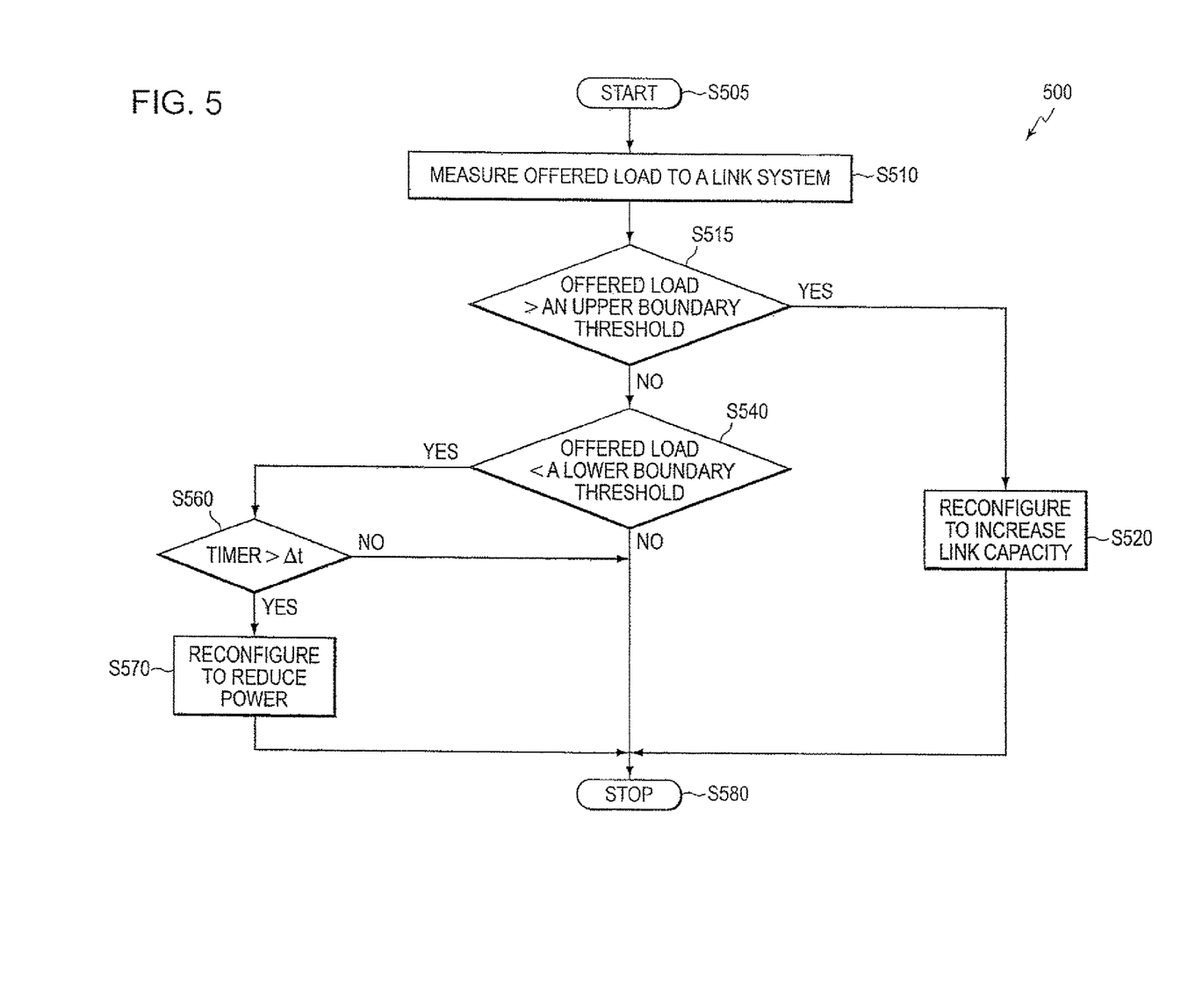
FIG. 5 shows a flow chart outlining a process example for reducing network power consumption of a network switch based on a traffic load.

FIG. 5 shows a flow chart outlining a process example 500 for a network switch to reduce power consumption based on an offered traffic load to a link system. The link system may be coupled to the network switch, or may be a portion of the network switch. The process starts at step S505, and proceeds to step S510.

In step S510, the offered traffic load to the link system can be measured. Then the process proceeds to step S515.

In step S515, the offered traffic load can be compared to an upper boundary threshold corresponding to a present power consumption configuration of the network switch. When the offered traffic load is larger than the upper boundary threshold, the process proceeds to step S520, otherwise the process proceeds to step S540.

In step S520, the network switch may be reconfigured to increase link capacity, such as in a higher power consumption configuration. Then, the process proceeds to step S580, and terminates.

In step S540, the offered traffic load can be compared to a lower boundary threshold corresponding to the present power consumption configuration of the network switch. If the offered traffic load is larger than the lower boundary threshold, the network switch can keep the current power consumption configuration, thus the process proceeds to step S580, and terminates. Otherwise, the process proceeds to step S560.

In step S560, a timing of the offered traffic load keeping below the lower boundary threshold may be determined and compared to a time duration, which can be a user defined parameter. For example, the network switch may use a timer to track time. The timer may be reset when the offered load is larger than the upper boundary threshold. In addition, the timer may be reset when the offered load is larger than the lower boundary threshold. Thus, the timer can keep running only if the offered load is lower than the lower boundary threshold. Therefore, the link system can compare the timer to the time duration to determine if the offered load keeps below the lower boundary threshold for the time duration.

If the timer is smaller than the time duration, the network switch can keep the present power consumption configuration, then the process proceeds to step S580 and terminates. On the other hand, if the timer is larger than the time duration, the offered traffic load has been kept below the lower boundary threshold for the time duration, the process then proceeds to step S570.

In step S570, the network switch may be reconfigured to provide a downgraded link capacity, such as a lower power consumption configuration. Then, the process proceeds to step S580 and terminates.

It is noted that the process 500 may be repeatedly executed during the time the network switch is in operation.

While the invention has been described in conjunction with the specific embodiments thereof that are proposed as examples, it is evident that many alternatives, modifications, and variations will be apparent to those skilled in the art. Accordingly, embodiments of the invention as set forth herein are intended to be illustrative, not limiting. There are changes that may be made without departing from the spirit and scope of the invention.

What is claimed is:

1. A method for reducing power consumption in a network switch, comprising:
   detecting at the network switch a traffic load of network traffic passing through the network switch based on a fullness state of a plurality of queues for buffering packets in the network switch, the detecting at the network switch comprising calculating averaged counts of bytes being en-queued during different time periods;
   determining by a controller circuit whether the traffic load of network traffic passing through the network switch is lower than a first boundary threshold;
   counting bytes that are en-queued during a first time period using a first counter that roles as an active counter while a second counter roles as a history counter;
   keeping counts of bytes that are en-queued during a second time period that is previous to the first time period using the second counter;
   switching the roles of the first counter and the second counter; and
   averaging counts of the bytes in the first and second counters.

2. The method according to claim 1, wherein the network switch includes a first power consumption configuration providing a first capacity for serving network traffic by the network switch, and a second power consumption configuration that is lower than the first power consumption configuration and providing a second capacity that is lower than the first capacity.

3. The method according to claim 2, further comprising:
   reconfiguring the network switch from the first power consumption configuration into the second power consumption configuration when the network traffic passing through the network switch is lower than the first boundary threshold.

4. The method according to claim 3, wherein reconfiguring the network switch into the second power consumption configuration, further comprises:
   powering off a port of the network switch.

5. The method according to claim 3, wherein reconfiguring the network switch into the second power consumption configuration, further comprises:
   powering off a crossbar switch module of the network switch.

6. The method according to claim 3, wherein reconfiguring the network switch into the second power consumption configuration, further comprises:
   reducing an operating frequency of a port of the network switch.

7. The method according to claim 2, wherein determining by a controller circuit whether the traffic load of network traffic passing through the network switch is lower than a first boundary threshold, further comprises:
   determining whether the traffic load keeps below the first boundary threshold for a time duration; and
   reconfiguring the network switch from the first power consumption configuration into the second power consumption configuration when the traffic load keeps below the first boundary threshold for the time duration.

8. The method according to claim 2, wherein the network switch includes a third power consumption configuration providing a third capacity that is larger than the first capacity, further comprising:
   determining whether the traffic load is higher than a second boundary threshold; and
   reconfiguring the network switch from the first power consumption configuration into the third power consumption configuration when the traffic load is higher than the second boundary threshold.

9. A network switch, comprising:
   a plurality of queues configured to buffer packets; and
   a controller circuit configured to detect a traffic load of network traffic passing through the network switch based on a fullness state of the queues, determine whether the traffic load is lower than a first boundary threshold and to calculate averaged counts of bytes being en-queued during different time periods, count bytes that are en-queued during a first time period using a first counter that roles as an active counter while a second counter roles as a history counter, keep counts of bytes that are en-queued during a second time period that is previous to the first time period using the second counter, switch the roles of the first counter and the second counter, and average counts of the bytes in the first and second counters.

10. The network switch according to claim 9, wherein the network switch includes a first power consumption configuration providing a first capacity for serving network traffic by the network switch, and a second power consumption configuration that is lower than the first power consumption configuration and providing a second capacity that is lower than the first capacity.

11. The network switch according to claim 10, wherein the controller circuit is further configured to reconfigure the network switch from the first power consumption configuration into the second power consumption configuration when the network traffic passing through the network switch is lower than the first boundary threshold.

12. The network switch according to claim 10, herein the controller circuit is further configured to determine whether the traffic load keeps below the first boundary threshold for a time duration and reconfigure the network switch from the first power consumption configuration into the second power consumption configuration when the traffic load keeps below the first boundary threshold for the time duration.

13. The network switch according to claim 10, wherein the network switch includes a third power consumption configuration providing a third capacity that is larger than the first capacity, the controller circuit is further configured to determine whether the traffic load is higher than a second boundary threshold and reconfigure the network switch from the first power consumption configuration into the third power consumption configuration when the traffic load is higher than the second boundary threshold.

14. A method for reducing power consumption in a network switch, comprising:
- providing a traffic capacity by the network switch between Y number of packet processing components and another network switch via X number of crossbar switch modules coupled to Y number of packet processing components in parallel, each of the crossbar switch modules being coupled to each of the packet processing components by X×Y number of cross bar links, X and Y being greater than one;
- selectively powering on a subset of the crossbar switch modules to provide a first link capacity based on a detected traffic load of the network switch;
- counting bytes that are en-queued during a first time period using a first counter that roles as an active counter while a second counter roles as a history counter;
- keeping counts of bytes that are en-queued during a second time period that is previous to the first time period using the second counter;
- switching the roles of the first counter and the second counter; and
- averaging counts of the bytes in the first and second counters.

15. The method according to claim 14, further comprising:
- powering off a crossbar switch module of the subset to provide the network switch with a second link capacity that is lower than the first link capacity when the detected traffic load is lower than a first boundary threshold.

16. The method according to claim 15, further comprising:
- powering off the crossbar switch module when the detected traffic load keeps below the first boundary threshold for a time duration.

* * * * *